(12) United States Patent
Augustin et al.

(10) Patent No.: US 12,528,557 B2
(45) Date of Patent: Jan. 20, 2026

(54) THREE-WHEELED VEHICLE HAVING A MULTI-PART FRAME

(71) Applicant: Bayerische Motoren Werke Aktiengesellschaft, Munich (DE)

(72) Inventors: Stephan Augustin, Munich (DE); Robert Bobinger, Huegelshart (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 320 days.

(21) Appl. No.: 18/014,282

(22) PCT Filed: Feb. 12, 2021

(86) PCT No.: PCT/EP2021/053483
§ 371 (c)(1),
(2) Date: Jan. 3, 2023

(87) PCT Pub. No.: WO2022/012783
PCT Pub. Date: Jan. 20, 2022

(65) Prior Publication Data
US 2023/0264775 A1    Aug. 24, 2023

(30) Foreign Application Priority Data

Jul. 15, 2020  (DE) ..................... 10 2020 118 623.1

(51) Int. Cl.
*B62K 5/06*         (2006.01)
*B62K 5/027*        (2013.01)
(Continued)

(52) U.S. Cl.
CPC ............... *B62K 5/06* (2013.01); *B62K 5/027* (2013.01); *B62K 5/10* (2013.01); *B62K 7/04* (2013.01); *B62K 21/02* (2013.01); *B62M 6/45* (2013.01)

(58) Field of Classification Search
CPC ... B62K 5/02; B62K 5/06; B62K 5/10; B62K 5/027; B62K 7/04
See application file for complete search history.

(56) References Cited

U.S. PATENT DOCUMENTS 3,504,934 A      4/1970  Wallis
3,605,929 A  *   9/1971  Rolland ................ B62D 61/08
                                                   280/DIG. 5
(Continued)

FOREIGN PATENT DOCUMENTS

CN      101557977 A     10/2009
CN      201923270 U      8/2011
(Continued)

OTHER PUBLICATIONS

International Search Report (PCT/ISA/210) issued in PCT Application No. PCT/EP2021/053483 dated Apr. 23, 2021 with English translation (seven (7) pages).

(Continued)

*Primary Examiner* — Brian L Swenson
(74) *Attorney, Agent, or Firm* — Crowell & Moring LLP

(57) ABSTRACT

A vehicle, such as a cargo cycle, may have a multi-part frame, a single wheel and a wheel pair having two mutually spaced wheels. The single wheel may be connected to a first frame part of the frame, and the two wheels may be rotatably mounted about a common axis on a second frame part of the frame, where the first and second frame parts are connected with at least one joint and are rotatable relative to each other about a pivot axis defined by the at least one joint, the pivot axis running through a contact point of the single wheel. The vehicle also has at least one first drive device which generates a torque, is arranged on the first frame part and is designed to transmit the torque via a device for torque transmission to at least one of the wheels of the wheel pair.

18 Claims, 7 Drawing Sheets

(51) Int. Cl.
*B62K 5/10* (2013.01)
*B62K 7/04* (2006.01)
*B62K 21/02* (2006.01)
*B62M 6/45* (2010.01)

(56) References Cited

U.S. PATENT DOCUMENTS

| | | | |
|---|---|---|---|
| 3,880,449 A | 4/1975 | Wada | |
| 3,995,875 A | 12/1976 | Wada | |
| 4,789,173 A | 12/1988 | Lofgren et al. | |
| 5,240,267 A * | 8/1993 | Owsen | B62K 5/02 280/282 |
| 5,501,478 A * | 3/1996 | Doan | B62M 1/00 280/282 |
| 5,678,835 A | 10/1997 | Sung et al. | |
| 5,730,453 A * | 3/1998 | Owsen | B62K 5/02 280/282 |
| 6,104,154 A | 8/2000 | Harada et al. | |
| 2007/0152422 A1 * | 7/2007 | Lin | B62K 5/10 280/275 |
| 2008/0001374 A1 * | 1/2008 | Liao | B62K 9/02 280/62 |
| 2009/0289437 A1 | 11/2009 | Steinhilber | |
| 2012/0248726 A1 * | 10/2012 | Batdorf | B60G 3/20 280/124.117 |
| 2016/0096574 A1 | 4/2016 | Liu | |
| 2017/0043805 A1 | 2/2017 | Krammel | |
| 2021/0024164 A1 * | 1/2021 | Mauck | B62K 19/46 |
| 2022/0048588 A1 * | 2/2022 | Moroni | B62K 5/10 |

FOREIGN PATENT DOCUMENTS

| | | |
|---|---|---|
| CN | 105813922 A | 7/2016 |
| CN | 107743467 A | 2/2018 |
| DE | 41 24 926 A1 | 1/1993 |
| DE | 195 13 649 A1 | 10/1996 |
| DE | 100 54 273 A1 | 5/2002 |
| DE | 10 2006 052 041 A1 | 5/2008 |
| DE | 10 2010 009 866 A1 | 4/2012 |
| DE | 10 2014 113 710 A1 | 3/2016 |
| DE | 10 2016 115 803 A1 | 7/2017 |
| DE | 10 2017 002 263 A1 | 9/2018 |
| DE | 10 2016 120 697 B4 | 12/2018 |
| EP | 3 205 564 B1 | 6/2019 |
| FR | 3 020 335 B1 | 9/2017 |
| GB | 2560740 A | 9/2018 |
| GB | 2560760 A | 9/2018 |
| JP | 3-153484 A | 7/1991 |
| JP | 9-272481 A | 10/1997 |
| JP | 5995434 B2 | 9/2016 |
| KR | 10-1197628 B1 | 11/2012 |
| WO | WO 2005/030559 A1 | 4/2005 |
| WO | WO 2011/107674 A1 | 9/2011 |
| WO | WO 2018/172784 A1 | 9/2018 |
| WO | WO 2019/162714 A1 | 8/2019 |

OTHER PUBLICATIONS

German-language Written Opinion (PCT/ISA/237) issued in PCT Application No. PCT/EP2021/053483 dated Apr. 23, 2021 (six (6) pages).
German-language Office Action issued in German Application No. 10 2020 118 623.1 dated Dec. 22, 2020 (five (5) pages).
German-language Office Action issued in German Application No. 10 2020 007 995.4 dated May 19, 2022 (six (6) pages).
International Search Report (PCT/ISA/210) issued in PCT Application No. PCT/EP2021/064644 dated Jul. 28, 2021 with English translation (7 pages).
German-language Written Opinion (PCT/ISA/237) issued in PCT Application No. PCT/EP2021/064644 dated Jul. 28, 2021 with English translation (8 pages).
U.S. Non-Final Office Action issued in U.S. Appl. No. 18/013,459 dated Aug. 12, 2025 (21 pages).
English translation of Chinese-language Office Action issued in Chinese Application No. 202180043877.7 dated Sep. 13, 2025 (8 pages).
English translation of Chinese-language Office Action issued in Chinese Application No. 202180043017.3 dated Sep. 13, 2025 (8 pages).

* cited by examiner

THREE-WHEELED VEHICLE HAVING A MULTI-PART FRAME

BACKGROUND AND SUMMARY

The invention relates to a three-wheeled vehicle, in particular a cargo bike, which has a multi-part frame, in particular a frame divided into two, the frame parts thereof being connected by at least one joint, and the at least one joint thereof defining a pivot axis about which the frame parts are pivotable relative to one another, or mutually pivotable, respectively.

Cargo bikes nowadays, and against the background of new concepts and solutions for individual mobility being required, are becoming ever more popular. Therefore, a multiplicity of implementations relating to these cargo bikes and to three-wheeled vehicles in general are already known in the prior art.

For example, there are two-wheeled and three-wheeled cargo bikes, wherein in the case of three-wheeled cargo bikes a pair of wheels having two wheels may be disposed at the front or the rear. Such cargo bikes, or generally such three-wheeled vehicles, include not only purely pedal-driven bikes but likewise e-bikes which support the mechanical drive by an electric drive, but also other three-wheeled vehicles which are exclusively motor-driven, for example.

However, cargo bikes, bicycles or e-bikes having a plurality of wheels are typically long, heavy and difficult to steer. In particular when a load is additionally being carried it may arise that this load, as a moving mass, acts on the vehicle and counteracts the steering movements, which may lead to critical or even dangerous and uncontrollable steering maneuvers and thus to accidents.

Apart from the difficult steering, the frame can be set in vibration by the moving mass during load reversals, which over time can be detrimental to the stiffness and stability of the frame such that the frame may break.

It follows from this disadvantageous behavior, which is unexpected for many drivers, that the cargo bikes, or three-wheeled vehicles, respectively, that are known in the prior art cannot be intuitively operated by drivers who are used to a customary bicycle. Accordingly, many drivers require some initial familiarization and training before the cargo bikes can be safely driven, or before the cargo bikes are to be driven in traffic.

In the case of bicycles having two wheels, or a pair of wheels, at the front, complex axle steering is required in some instances. Variants of cargo bikes having two wheels, or a pair of wheels, at the rear, such as conventional rikshaws, for example, are often of a rigid embodiment such that the frame of the bicycle cannot lean into the curve.

However, there are also variants of three-wheeled vehicles in which the entire frame, or at least part thereof, and in particular the front part of the frame, is laterally pivotable and, as a result, can lean into the curve when cornering, this being fundamentally intended to enable a more ergonomic and more dynamic driving style and also corresponding to the behavior of a "normal" bicycle.

Such vehicles, having an at least partially pivotable frame, are known from documents DE 10 2014 113 710 A1, DE 10 2016 115 803 A1, EP 3 205 564 B1, DE 10 2016 120 697 B4, FR 3 020 335 B1, JP 5995434 B2, KR 10-1197628, U.S. Pat. Nos. 3,605,929 A, 6,104,154 A, and WO 2011/107674 A1, for example. Further such vehicles are described in documents DE 10 2017 002 263 A1, U.S. Pat. No. 3,504,934 A and DE 10 2010 009 866 A1.

However, the pivoting in the known solutions, as a result of the respective superstructure, leads to lateral forces potentially engaging on the front wheel when leaning into the curve, the front wheel by these forces being steered out its track such that the front wheel is offset in relation to its previous track relative to the pair of wheels on the rear axle (the rear wheels), this having a negative effect on the steering behavior.

Moreover, a lever action as a result of the pivoting is often generated on the front wheel, as a result of which the latter is pushed downward while negotiating curves, this increasing the probability of the frame, or the pivotable front part of the frame, tilting. This lever action, or the force caused by the lever action, respectively, is moreover dependent on the payload such that the behavior of the vehicle can vary heavily as a function of the payload, or as a function of the moving masses, respectively, this adding to the unpredictability of the vehicle.

An alignment of a pivot axis that reduces the lever action is shown in GB 2 560 760 A, the pivot axis to this end being inclined in the direction of a contact point of a front wheel. This embodiment comprises a complex powertrain which uses an expensive and moreover heavy prop shaft for transmitting a torque to the rear wheels to be driven.

Therefore, in at least one aspect, the invention is based on the object of overcoming the afore-mentioned disadvantages of the prior art and of providing a three-wheeled vehicle which, on the one hand, has a driving behavior similar to that of a conventional bicycle and makes it possible to lean into curves, and nevertheless offers an ideally light, cost-effective and nevertheless durable powertrain which, despite leaning into curves, ensures as little wear and tear as possible.

This object is achieved by the combination of features according to the claims.

Proposed according to the invention is a vehicle, in particular a cargo bike, which has a multi-part frame, preferably a two-part frame, a single wheel, and a pair of wheels. Apart from a cargo bike which is operated purely by muscular power, inter alia three-wheeled e-bikes or hybrid solutions are also understood to be such a vehicle which is three-wheeled on account of the single wheel and the pair of wheels. A single wheel is in particular understood to be a singular wheel, wherein a plurality of wheels that substantially act as one wheel may also represent a single wheel, this being the case, for example, when these wheels are embodied as a twin wheel, or the spacing between the wheel or tire contact faces, respectively, is very minor and below 5 cm, for example. The pair of wheels has in particular two wheels which are mutually spaced apart in a transverse direction of the vehicle. The single wheel is connected to a first frame part of the multi-part frame, and the two wheels of the pair of wheels are mounted on a second frame part of the frame so as to be rotatable about a common axis, for example a rear axle of the vehicle. The common axis can be implemented as a real axle, thus as a continuous shaft, or with articulated shafts, or be implemented as a virtual common axis, thus an imaginary axis, in relation to which the two shafts of the two wheels of the pair of wheels are in each case disposed so as to be coaxial.

The connection between the single wheel and the first frame part is preferably embodied by way of an intermediate element, such as a wheel fork, for example, such that the single wheel, in particular as the front wheel, is fixed to the first frame part with the wheel fork and with the latter is pivotable about a steering axis. Accordingly, the single wheel is assigned to the first frame part, and the pair of wheels is assigned to the second frame part.

It is furthermore provided that the first frame part and the second frame part are connected by at least one joint and are mutually rotatable, or able to be twisted or pivoted, respectively, about a pivot axis defined by the at least one joint, such that the first frame part can thus be moved relative to the second frame part about the pivot axis. The pivot axis here runs through a contact point of the single wheel.

Moreover, the vehicle has at least one first drive device which generates a torque and is disposed on the first frame part and, by way of a torque transmission device, is configured to transmit the torque to at least one of the two wheels of the pair of wheels. The torque transmission device comprises a compensation device for compensating torsion of the torque transmission device that is caused by the rotation of the first frame part in relation to the second frame part about the pivot axis.

Since wheels in an ideal case, which at best is absent in reality, contact a hard surface or the carriageway only at a single one-dimensional point, the contact point, which may also be referred to as the wheel contact point, is not understood to be only a one-dimensional point but rather also the contact area, or an idealized contact point of the single wheel within the contact area, on a carriageway or a hard surface.

As a result of the pivot axis running through the contact point, a rotation of the single wheel during pivoting of the frame parts takes place about the contact point such that no track offset and no leverage arise. As a result, riding without holding the handlebars is also possible, for example. As a result of the rear structure, or the rear or second frame part, respectively, being decoupled from the pivot axis, the weight of a load bearing on the second frame part is neither steered nor does the latter lean into the curve, so that these masses do not act as a moving mass and have no negative effect on the behavior of the front or first frame part, or the driving behavior of the vehicle, respectively.

According to one preferred embodiment, the pivot axis runs in a symmetry plane of the vehicle, or in a symmetry plane of the frame, or at least of the first frame part, respectively.

As described above, the vehicle comprises the first drive device which generates a torque. This first drive device can be a motor and/or else a device for driving using muscular power. The first drive device is disposed on the first frame part and, by way of the torque transmission device, is configured to transmit the torque to at least one of the wheels of the pair of wheels that are assigned to the second frame part. The first drive device can optionally have an integrated gearbox, for example be configured as a motor having an integrated gearbox.

It is thus provided that the transmission of torque by the corresponding torque transmission device takes place across a separating plane of the vehicle between the two frame parts, wherein the torque transmission device is preferably configured to permit pivoting or twisting of the frame parts about the pivot axis without being damaged, respectively.

The torque transmission device preferably comprises at least one traction device.

For example, the torque transmission device as a traction device can comprise a chain drive which has at least one chain and of which the chain permits and compensates the twisting about the pivot axis, or of which the chain is configured to permit and compensate the twisting about the pivot axis at least within a pre-defined range, respectively. For this purpose, only a chain guide and/or a chain tensioner, by way of which it is ensured that the chain does not jump from the associated sprockets while the frame parts are pivoted, can optionally be provided.

The compensation device is provided in particular for compensating the twisting. This compensation device is configured in such a manner that the twisting can be partially or completely mechanically compensated, and wear and tear of the chain drive by virtue of excessive friction, which would otherwise be increased, is correspondingly reduced or minimized.

For example, the mechanical transmission of force, or the transmission of torque, respectively, can take place in a manner optimized in terms of force, and in a simple and cost-effective manner with a bicycle chain which enables torsion between a front chainring on the first frame part and a rear sprocket on the second frame part of at least 45°, and has to be guided in each case only at the top and the bottom on the front chainring and on the rear sprocket in order to prevent the chain from jumping off.

As an alternative to the chain drive described, the torque transmission device as a traction device can also comprise a belt drive, in particular a timing belt drive. The latter is configured in a manner analogous to that of the chain drive. The compensation device is also provided for compensating the twisting in this case, such that wear and tear of the belt drive by virtue of excessive friction as a consequence of twisting can again be reduced or minimized.

For example, the compensation device can comprise a constant velocity joint. The constant velocity joint can be assigned to the first frame part or the second frame part.

The constant velocity joint can be configured in such a manner that a sprocket provided on the drive side of the constant velocity joint, for example the rear sprocket of the chain drive or of the belt drive, can be tilted in relation to an output axle of the constant velocity joint, in particular tilted laterally in the transverse direction of the vehicle.

For example, a housing of the constant velocity joint can be rigidly connected to the first frame part, or at least be mounted on the first frame part, such that the housing is tilted conjointly with the first frame part. Alternatively, the housing of the constant velocity joint can be positioned so as to float on the output axle such that the housing can be tilted in relation to the output axle, for example be tilted conjointly with the sprocket which entrains the housing during tilting. One or a plurality of support elements, in particular auxiliary arms, of the first frame part, which during a pivoting movement of the first frame part impinge the housing of the constant velocity joint and move the latter to a tilted position, can optionally be provided.

In any case, the output axle of the constant velocity joint can preferably be formed by the rear axle of the vehicle or at least be coupled in a torque-transmitting manner to the latter. The output axle, or the rear axle, respectively, in this case is indeed rotatably mounted on the second frame part but relative pivoting in relation to the second frame part by virtue of the mutual pivoting movement of the frame parts is prevented by a correspondingly fixed mounting. Consequently, the output axle is thus not pivoted.

With the aid of the degree of freedom provided thereby, the constant velocity joint can compensate a pivoting movement of the remaining torque transmitting device in relation to the second frame part that the torque transmission device, by virtue of the connection thereof to the first frame part, is imparted when the first frame part is pivoted in relation to the second frame part about the pivot axis.

According to one preferred embodiment, the constant velocity joint can be disposed so as to be centric between the two wheels of the pair of wheels, for example thus be disposed on the symmetry plane of the vehicle.

As an alternative to the constant velocity joint, the compensation device can have a differential having at least one articulated shaft, wherein the differential by way of the at least one articulated shaft transmits the torque, which has been introduced into the differential by way of the torque transmission device, to the at least one wheel of the pair of wheels. The differential is preferably assigned to the first frame part such that the differential, conjointly with the first frame part, is pivoted about the pivot axis when the first frame part is pivoted in relation to the second frame part about the pivot axis. In order for the relative movement of the differential in relation to the second frame part caused as a result to be compensated, the differential on the output side is connected to the at least one articulated shaft for driving the at least one wheel of the pair of wheels to be driven.

If both wheels of the pair of wheels are to be driven, the compensation device can comprise two articulated shafts, wherein one of the two articulated shafts connects in a torque-transmitting manner in each case one of the two wheels to be driven to in each case one output side of the differential. By virtue of the degrees of freedom achieved by the articulated shafts, a compensation of the pivoting movement, or a compensation of inclination, can be provided, respectively. Additionally, this embodiment offers the optional possibility of providing a spring system, in particular an independent spring system, for each of the two wheels of the pair of wheels.

According to one preferred embodiment, the differential can be disposed so as to be centric between the two wheels of the pair of wheels, for example thus be disposed on the symmetry plane of the vehicle.

The pivot axis and the compensation device are preferably mutually aligned in such a manner that the pivot axis, at least in a lateral view of the vehicle, points in the direction of the compensation device. In other words, the pivot axis, or the imaginary extension thereof, intersects the compensation device in such a manner that the pivot axis, at least in a lateral view of the vehicle, runs through the compensation device.

The pivot axis, or the imaginary extension thereof, preferably actually intersects the compensation device such that the pivot axis, independently of the viewing direction, runs through the compensation device, or intersects the latter, respectively.

In any case, the intersection point created (only in the lateral view, or the actual intersection point) is not to be understood to be a single one-dimensional point in the center of the compensation device; rather, the intersection point is only to lie within the compensation device. As an example to this end, the pivot axis can intersect a housing of the compensation device configured as a constant velocity joint or as a differential.

In principle, the disposal of the pivot axis and the compensation device described offers the advantage that any torsion, and any potential change in the position of the torque transmission device, can be particularly effectively reduced or even avoided. Accordingly, wear and tear otherwise induced by the torsion can be even further reduced. Moreover, additional tensioning elements of the torque transmission device can be dispensed with if required.

If the pivot axis, as has been described above, is disposed in the symmetry plane of the vehicle, or in a symmetry plane of the frame or at least of the first frame part, respectively, the compensation device can preferably likewise be disposed in this symmetry plane.

As has been mentioned above, the single wheel is preferably a front wheel which on a wheel fork is connected to the first frame part so as to be pivotable about a steering axis. Accordingly, the wheels of the pair of wheels form the rear wheels of the vehicle. Since the contact point forms the lowest point of the single wheel, or front wheel, respectively, the pivot axis, proceeding from the rear of the vehicle, slopes downward in the direction of the front wheel.

One advantageous refinement provides that the first frame part and the second frame part are connected by at least two joints which are disposed so as to be mutually spaced apart on the pivot axis. While the frame parts are preferably connected exclusively by the joints, a device for the transmission of torque or control device, such as chains, brake cables, electrical lines or the like, for example, can extend between the frame parts. A first joint of the two joints is a ball joint, a radial bearing or an elastomer element which is in particular flexible and reversibly deformable. Furthermore, a second joint of the two joints is a ball joint, a radial bearing or an elastomer element which is likewise in particular flexible and reversibly deformable. This gives rise to various advantageous combinations. For example, the first and the second joint can in each case be a ball joint, in each case be a radial bearing, or in each case be an elastomer element, wherein hybrid forms in which the first joint is an elastomer element and the second joint is a ball joint, for example, are also possible. Elastomer elements moreover have the advantage that the latter not only permit pivoting but at the same time also absorb impacts and shocks and transmit the latter less intensely to the vehicle frame.

In order for the profile of the pivot axis to be able to be adjusted, for example when replacing the wheel of the single wheel or in any other situation that displaces the contact point in relation to the pivot axis, in one particularly advantageous refinement the position of the first joint and/or of the second joint in relation to the first frame part and/or the second frame part is adjustable. The position, or the respective position, of the joint is preferably adjustable in the horizontal direction, or in the height direction in terms of the vehicle, and/or in the vertical direction or in the longitudinal direction in terms of the vehicle, respectively, such that, as a result of a corresponding adjustability of the position, or as a result of a corresponding displacement capability of the joints, respectively, the pivot axis can be displaced or rotated to a profile that intersects the contact point.

The adjustability of the profile of the pivot axis can be utilized in very different situations which, as described above, may cause a displacement of the contact point. In this way, depending on the design embodiment, advantageous possibilities for utilizing this adjustability can present themselves for example for the customer as well as in the context of R&D and production of the vehicle. An identical frame and pivot axis assembly for different drive concepts, or vehicle variants, respectively, can already be provided in the basic design of the vehicle, because any adjustment or setting for the specific variant of the drive concept can be performed with the aid of the adjustability. In this way it is possible, for example, to provide different compensation devices in an identical frame geometry, such as, for example, a constant velocity joint with a rigid axle, or alternatively a differential in conjunction with articulated shafts and a single wheel spring system, wherein the respective individual correct alignment of the pivot axis can be ensured with the adjustability.

However, the adjustability of the profile of the pivot axis also offers particular advantages for example to a user of the vehicle; the profile of the pivot axis can thus be subsequently adjusted or readjusted, respectively, in the case of a (subsequent) change in the wheel sizes and/or tire type. For example, the requirement of a geometrical readjustment may arise when changing from road tires to off-road tires or vice versa, the latter usually having a coarser tread in comparison to the road tires and potentially having the effect of a larger tire diameter, and/or by virtue of a tire pressure chosen for the environment of deployment. For example, a significantly lower tire pressure may be required for operating off-road than when operating purely on roads, for example during use in an urban area.

In any case, the adjustability can be embodied in such a manner that the latter can be performed by the customer, a workshop or the manufacturer, so as to perform the adjustment of the profile of the pivot axis required for the respective geometry and the desired specific application.

For example, the adjustability of the first joint and/or of the second joint in the height direction (thus in the vehicle height direction) and/or in the longitudinal direction of the vehicle can take place by way of at least one threaded portion of the joint that makes adjustment possible, for example. When using a ball joint, for example, a threaded portion which is screwed into a receptacle on the vehicle can be provided on the ball joint, the adjustability and thus the position of the ball head being achieved by way of the screw-in depth of the threaded portion.

The at least one joint can furthermore be disposed below a load carrier. For example, the second frame part can comprise an integral, substantially rectangular structure (in the plan view from above onto the vehicle) which is configured as the load carrier.

In any case, the load carrier can be configured such that the loads which are to be transported by the cargo bike can be disposed thereon or on the structure forming the load carrier directly, or by way of a receptacle (not illustrated) for example, such as a platform (also referred to as the bed), a basket or seats, on the second frame part.

In other words, the at least one joint in a plan view from above onto the vehicle is concealed or enclosed by the load carrier, or the at least one joint lies in the region of a projection area of the load carrier (in the case of a downward-directed projection direction).

The load carrier here can be provided so as to be rigid on the second frame part. When visualized, the at least one joint, at least in a lateral view of the vehicle, is therefore situated below the load carrier.

If at least two joints are provided according to an exemplary embodiment, both joints can be disposed below the load carrier, for example. The first and the second joint in the longitudinal direction of the vehicle can preferably be disposed so as to be in front of the rear axle. Alternatively, the first joint in the longitudinal direction of the vehicle can be disposed in front of the rear axle, and the second joint can be disposed behind the rear axle.

As has been described above, the pivot axis can thus in principle be virtually defined by at least two joints which lie so as to be separate from one another. Depending on the construction, the joints can indeed be placed in a freely chosen manner along the pivot axis A, and the angle of the pivot axis X can be freely defined by way of the position of the two joints. The further apart the two joints, the better the support of the second frame part on the first frame part, in particular in the event of a force acting on the rear, second frame part, for example as a result of impacts, potholes or knocks. In this way, the joints are also stressed to a lesser extent.

When positioned below the load carrier, the two joints can preferably be disposed in the region of a front end and of a rear end of the load carrier, so as to still mutually absorb in an optimal manner vertical forces acting between the first and the second frame part in the case of an ideally large mutual spacing. As a result of the ideally large spacing of the two separate joints, a freely available installation space is created along the virtual pivot axis below the load carrier in the intermediate space of the two separate joints. For example, frame components of the first and/or the second frame part can be accommodated in this region, and/or else components of the torque transmission device.

As an alternative to an embodiment which has two, or at least two, joints, a variant in which the first frame part and the second frame part are connected by exactly one joint formed by at least one radial bearing is likewise advantageous. While a plurality of radial bearings and/or axial bearings may be disposed in the preferably exactly one joint, the latter is distinguished in that the joint forms a single and preferably encapsulated module. As a result, the bearings of the joint are comparatively close to one another such that the forces cannot be absorbed in an optimal manner, but other advantages such as, for example, improved protection in relation to contamination, a more compact construction and simplified assembling are indeed derived owing to the improved encapsulation.

In order to be able to adjust the angle in the case of a single joint that permits pivoting about the pivot axis, and as a result to be able to adjust the profile of the pivot axis through the contact point, it is furthermore preferably provided that the angle of the single joint is adjustable in relation to the first frame part and/or the second frame part, the joint per se or the joint by a corresponding device thus being configured to be twisted about a transverse axis of the vehicle.

In order to prevent the vehicle or the first frame part from falling over when stationary, or to prevent a dangerous inclination of the first frame part in relation to the second frame part during travel, a further design embodiment provides that the vehicle furthermore comprises a delimiting device which is configured to restrict a rotatability of the first frame part in relation to the second frame part about the pivot axis, or to restrict the rotatability to a pre-defined angular range. Such a delimiting device can be, for example, also a simple stand which can be folded out when the vehicle is stationary and supports the first frame part in relation to the ground. Alternatively, a fixing device which when the vehicle is stationary can be disposed so as to rigidly connect the first frame part to the second frame part such that the frame parts can no longer rotate or pivot in relation to one another when stationary, can likewise be considered. Apart from such devices which are suitable only for the stationary vehicle, further alternatives which restrict a rotatability of the joints and as a result also restrict pivoting of the frame parts can also be considered.

A further alternative design embodiment provides that the vehicle furthermore comprises a restoring device which is configured to rotate or pivot the first frame part, from a position deflected in relation to a pre-defined central position, back to the central position. The central position here preferably corresponds to a resting position in which the first frame part and the second frame part are situated when traveling straight ahead without a steering input, or are in each case completely upright, respectively. Such a restoring device can be implemented by springs, for example, or else gas struts. In particular when an elastomer element is provided as one of the joints, the elastomer element can integrally form the delimiting device and/or the restoring device. Moreover, such a restoring device can complement or entirely replace a delimiting device, because the restoring device generates a restoring moment by way of which the frame, or the frame parts, respectively, are mutually aligned even when stationary.

The vehicle furthermore preferably has at least one further, second drive device which generates a torque and is a motor, for example, or a pedal mechanism which is operated by muscular force. The second drive device is disposed on the first frame part or directly on the single wheel and is configured to transmit the torque to the single wheel. For example, the motor of the second drive device for the single wheel can be a wheel hub motor which is assigned to the single wheel.

Alternatively, the second drive device is disposed on the second frame part or directly on one of the wheels of the pair of wheels and configured to transmit the torque to at least one of the wheels of the pair of wheels. Accordingly, the variants provide that the transmission of torque from the second drive device to the respective driven wheel or the respective driven pair of wheels does not take place by way of the separation plane between the frame parts but directly in the region of one of the frame parts. Such a second drive device can moreover also be provided as a wheel hub motor, for example, so that the second drive device can also be disposed directly in a wheel hub of the single wheel or in one of the wheels of the pair of wheels, for example. It goes without saying that this also means that each of the two wheels of the pair of wheels can each be assigned one wheel hub motor. If the rear wheels, or the wheels of the pair of wheels, respectively, are to be driven, the second drive device can be configured as a central rear or mid-mounted motor, wherein the torque between the wheels of the pair of wheels can be split and controlled by way of a torque-splitting device (torque vectoring).

A further variant provides that one drive device drives the single wheel as well as at least one of the wheels of the pair of wheels, wherein the transmission of torque in this instance takes place with at least one device suitable for this purpose.

The vehicle can also be provided with a serial hybrid drive in which a generator driven by muscular force generates current, for example, which with corresponding lines is transmitted across the separating plane between the frame parts to an electric drive device, the latter driving at least one of the wheels.

The features disclosed above can be combined in any suitable manner to the extent that this is technically possible and the features are not mutually contradictory.

BRIEF DESCRIPTION OF THE DRAWINGS

Other advantageous refinements of the invention are illustrated in more detail hereunder in conjunction with the description of the preferred embodiment of the invention by means of the figures. In the figures.

The figures are schematic in an exemplary manner. The same reference signs in the figures refer to identical functional and/or structural features.

DETAILED DESCRIPTION OF THE DRAWINGS

Figure 6A:
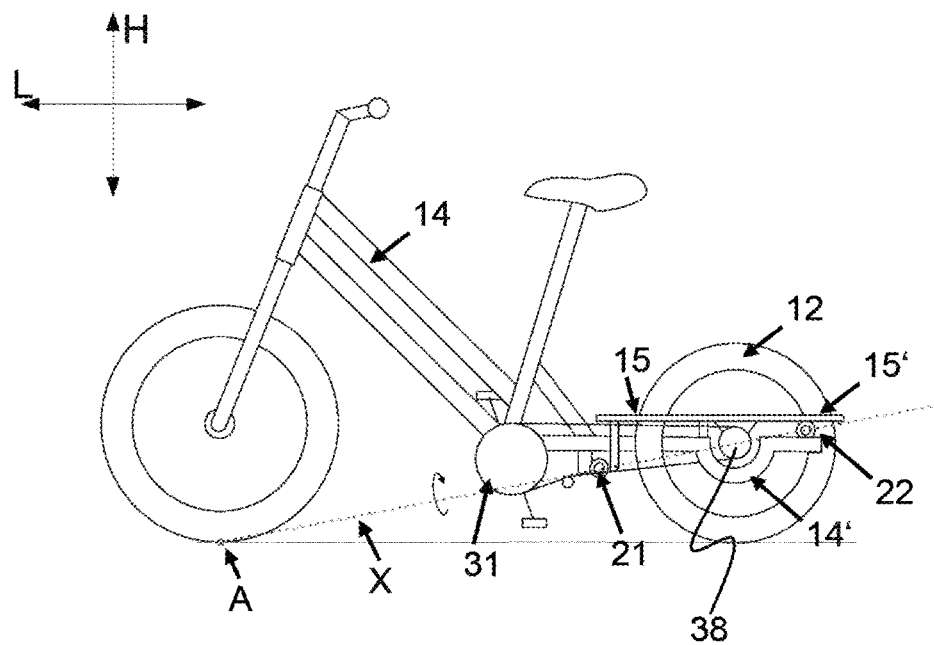
FIGS. 6a, 6b show a third vehicle variant in a lateral view and a plan view from above.
Figure 6B:
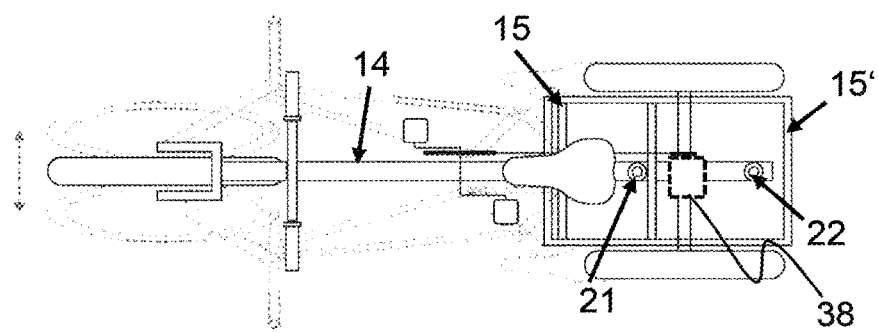
Figure 6B:
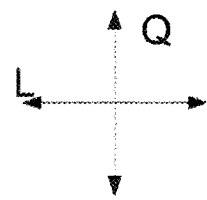

FIGS. 1a to 2b show two variants of a vehicle 1, in each case in a lateral view and in a plan view from above. FIGS. 6a and 6b additionally show a third variant.

The vehicle variants use in each case dissimilar joints 21, 22, 23 in order to configure a pivot axis X about which a first frame part 14 is pivotable in relation to a second frame part 15 of a vehicle frame, wherein the pivot axis X runs in each case through a contact point A of the single wheel 11 configured as the front wheel on or with the ground B, respectively.

Since the joint 23, or the joints 21, 22, is/are in each case disposed in a rear region, or on a rear region of the vehicle 1, respectively, and define a separating or dividing plane between the first, or the front, frame part 14 and the second, or the rear, frame part 15, respectively, this results in a profile of the pivot axis X that slopes downward from the rear toward the front and intersects the contact point A of the single wheel 11.

For the sake of improved orientation in the figures, a coordinate system or axis system, respectively, which identifies the respective axes is illustrated in all figures. The coordinate system, which refers to the vehicle, defines the longitudinal axis L of the vehicle, the height axis H of the vehicle, and the transverse axis Q of the vehicle.

Since a cargo bike is in each case illustrated as an exemplary embodiment of a vehicle 1 in FIGS. 1a to 2b, and 6a and 6b, the front wheel, or the single wheel 11, respectively, is mounted in each case on a wheel fork 16 and by way of the wheel fork 16 is connected to the first or the front frame part 14 so as to be rotatable about a steering axis. For the sake of simplification, the wheel fork 16 can be considered to be part of the first frame part 14.

A pedal drive or pedal mechanism, as is also known from conventional bicycles, is in each case provided as the drive device 31 for driving the vehicle 1 in FIGS. 1a to 2b, and 6a and 6b. Accordingly, a gearshift can also be provided, for example. Provided for transmitting a torque from the drive device 31, which is operated by muscular force, to at least one of the wheels 11, 12, 13 is presently a torque transmission device 34 which is configured as a chain drive or chain gear, respectively, such that the torque from the drive device 31 is thus transferred to an axle, the rear axle, which runs between the wheels 12, 13 of the pair of wheels with a chain running via sprockets, the rear wheels, thus the wheels 12, 13 of the pair of wheels, being equally driven by the rear axle in the examples illustrated in FIGS. 1a to 2b, and 6a and 6b.

Since a chain which spans the dividing plane between the frame parts 14, 15 is provided in the variants according to FIGS. 1a to 2b, and 6a and 6b, an (only optional) chain tensioner is furthermore shown in the figures, by way of which a pre-defined or adequate chain tension is maintained even when the chain is torsioned while tilting the frame parts 14, 15. Moreover, a guide installation for guiding the chain can preferably be provided.

The torque transmission device 34 furthermore comprises a compensation device 38 for compensating torsion of the torque transmission device 34 caused by the rotation of the first frame part 14 in relation to the second frame part 15 about the pivot axis X.

Figure 1A:
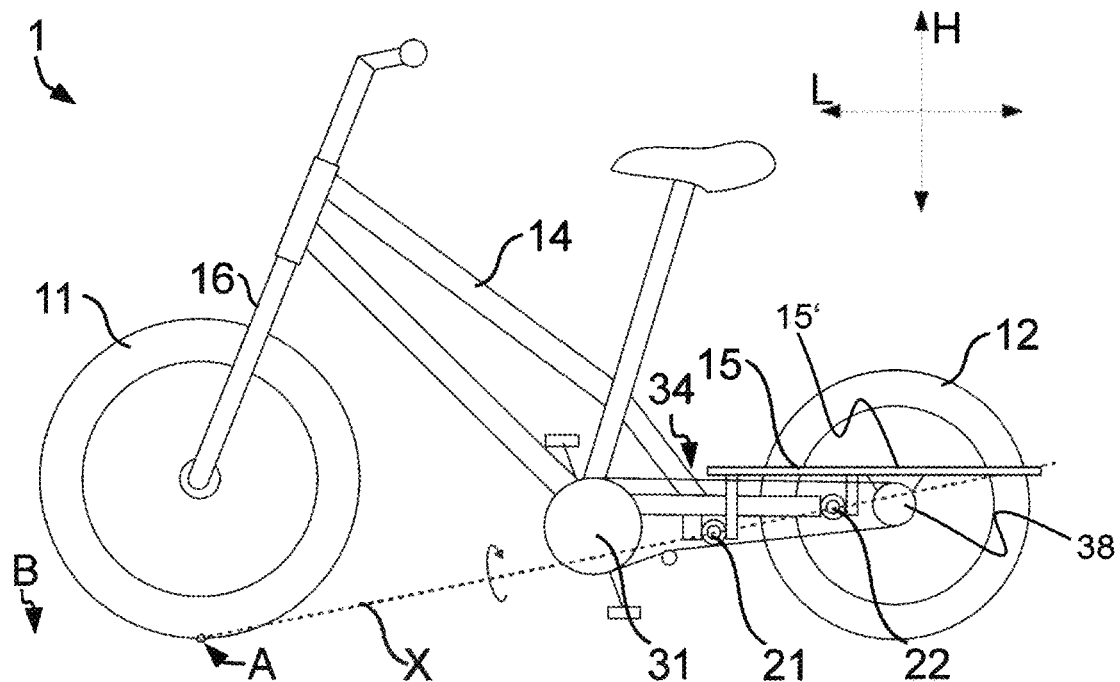
FIGS. 1a, 1b show a first vehicle variant in a lateral view and a plan view from above.
Figure 2A:
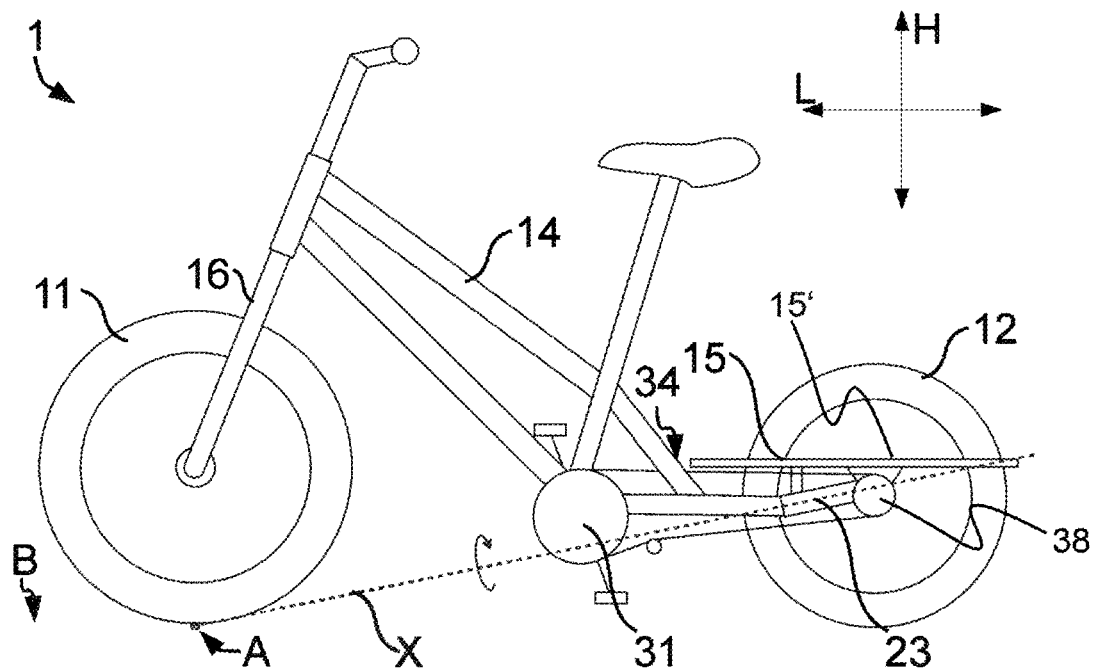
FIGS. 2a, 2b show a second vehicle variant in a lateral view and a plan view from above.

According to FIGS. 1*a* and 2*a*, the pivot axis X and the compensation device 38 are mutually aligned in such a manner that the pivot axis X, at least in a lateral view of the vehicle according to FIGS. 1*a* and 2*a*, and 6*a* and 6*b*, points in the direction of the compensation device 38.

Figure 1B:
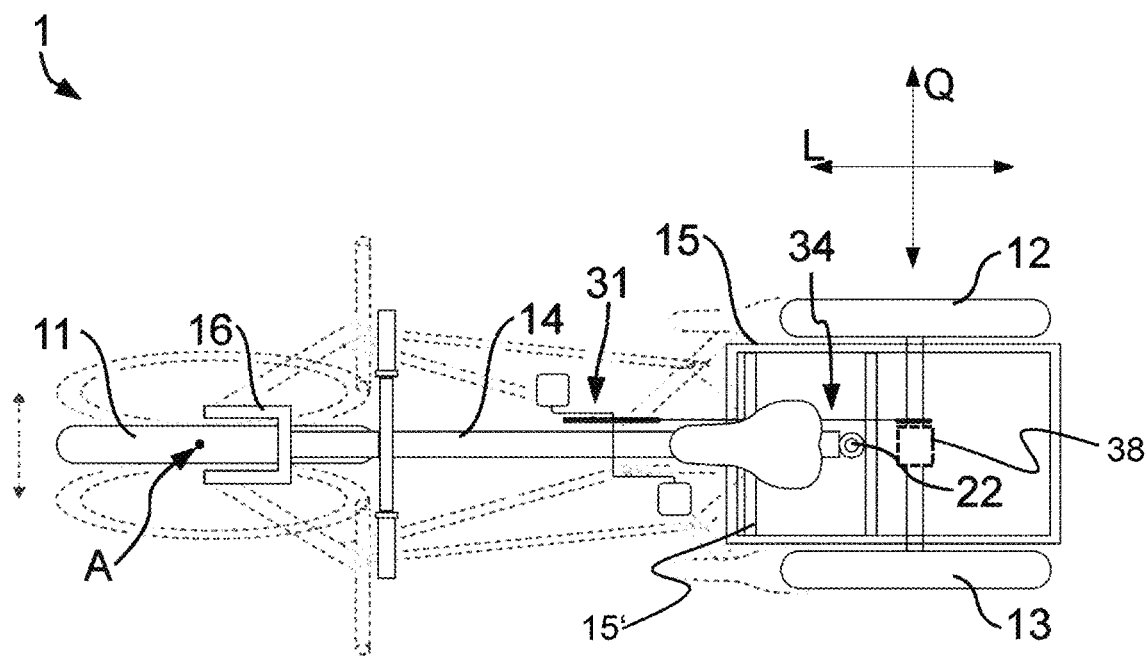
Figure 2B:
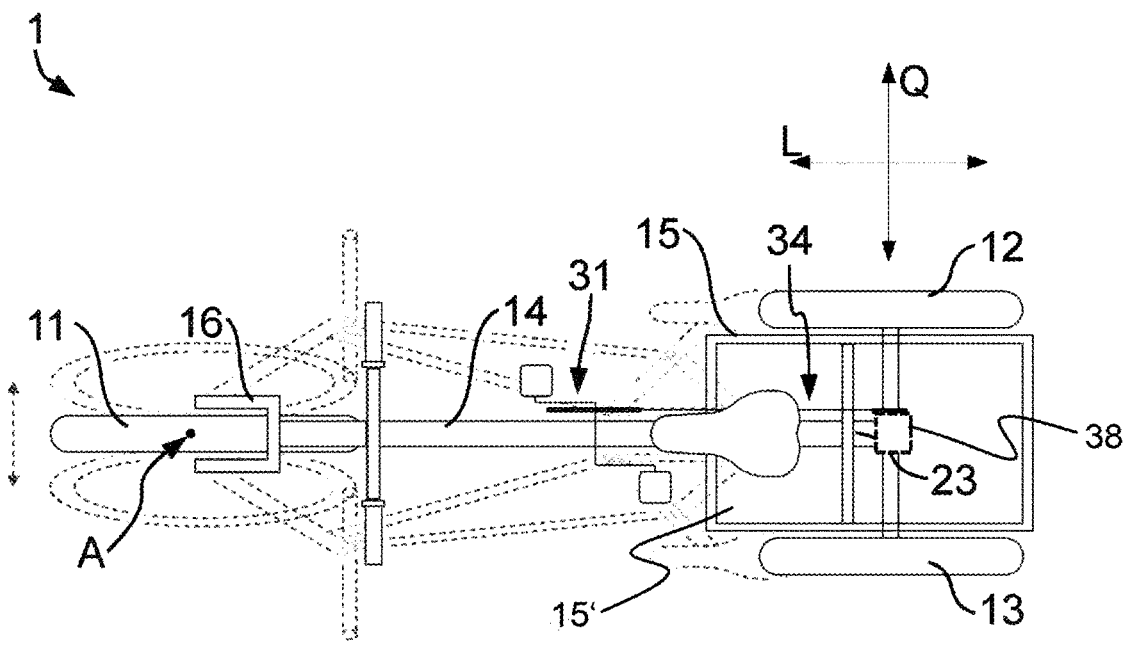

As can be seen in the plan views from above in FIGS. 1*b* and 2*b* and 6*b*, the pivot axis X, by virtue of the disposal thereof being in alignment with the longitudinal direction L, does actually intersect the compensation device 38 rather than only in the lateral view.

The drive configurations according to FIGS. 1*a* to 2*b* are only exemplary drive configurations, wherein further configurations are possible, for example according to FIGS. 4*a* to 4*b*, and FIGS. 5*a* to 5*d*.

It is furthermore to be established that the rear, or the second frame part 15, respectively, in the variants shown in FIGS. 1*a* to 2*b*, and 6*a* and 6*b*, and moreover also in the embodiment according to FIG. 4*c*, is configured as an integral, substantially rectangular structure (in the plan view from above) which is configured as the load carrier 15', on which the loads which are to be transported by the cargo bike can thus be disposed directly, or for example by way of a receptacle (not illustrated) such as a platform, a basket or seats, on the second frame part 15. The second frame part 15 thus comprises the integral, substantially rectangular structure (in the plan view from above) which is configured as the load carrier 15' on which the loads to be transported by the cargo bike 1 can thus be disposed directly, or for example by way of a receptacle (not illustrated) such as a platform, a basket or seats, on the second frame part.

Figure 4A:
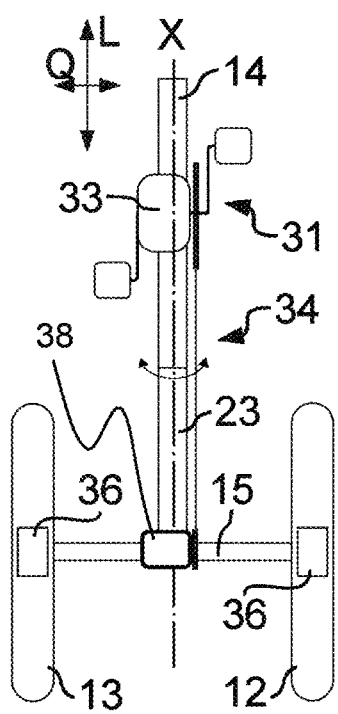
FIGS. 4a-b show in each case a drive configuration of a vehicle variant.
Figure 4B:
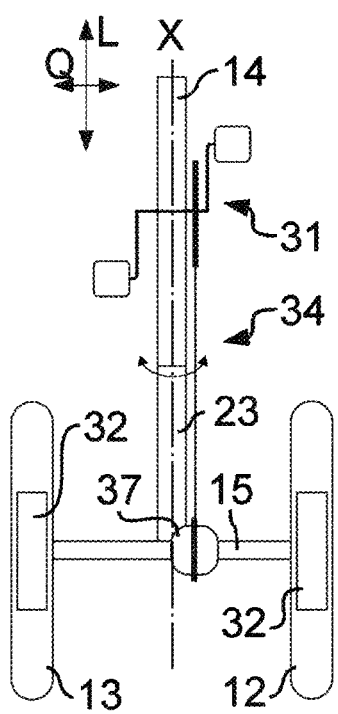

It is to be understood that the drive variants of FIGS. 4*a* and 4*b*, and of FIGS. 5*a* to 5*d*, can also have a load carrier of this type, even when a depiction in the illustrations of only fragments has been dispensed with for the sake of improved clarity.

In the variant according to FIGS. 1*a* and 1*b* the pivotability, or rotatability, respectively, of the front or first frame part 14 in relation to the rear or second frame part 15, the latter being supported in relation to the ground by way of the wheels 12, 13 that are spaced apart in the transverse direction Q of the vehicle, is implemented by two single joints 21, 22 which are mutually spaced apart along the pivot axis X. The same applies to the variant according to FIGS. 6*a* to 6*b*.

As can be seen from FIG. 1*a*, the two joints 21, 22 are disposed below the load carrier 15'. In particular, the first joint 21 and the second joint 22 in the longitudinal direction L of the vehicle 1 are disposed in front of the rear axle. In the variant illustrated in FIGS. 6*a* and 6*b*, the two joints 21, 22 are likewise disposed below the load carrier 15', wherein the first joint 21 in the longitudinal direction L is disposed in front, and the second joint 22 in the longitudinal direction L of the vehicle 1 is disposed behind, the common axle that supports the two wheels 12, 13.

However, it applies in principle that the further the single joints 21, 22 are spaced apart along the pivot axis X, the better the forces acting between the frame parts 14, 15 can be absorbed. To this end, even further single joints may be provided. The two single joints 21, 22 presently are configured as a ball joint or a ball head joint, respectively, which have been known for a long time in the prior art and the construction of which therefore is not to be described in more detail. In terms of these joints it is only pointed out that a joint head of the ball joint is connected in a substantially rigid manner to one of the frame parts 14, 15, and that a joint socket, in which the joint head is mounted so as to be rotatable in multiple axes, is connected in a substantially rigid manner to the respective other frame part 14, 15. As a result of at least two such joints 21, 22 which are configured as a ball joint, the degrees of freedom of the joints are restricted to a rotatability about the pivot axis X.

Deviating therefrom, the variant according to FIGS. 2*a* and 2*b* does not provide two single joints 21, 22 but provides exclusively a single joint 23 which can be formed by an elongate radial bearing or joint, respectively, or else by a plurality of radial bearings or joints, respectively, that are encapsulated in a module. In comparison to the embodiment of FIGS. 1*a* and 1*b*, this results in an improved encapsulation of the joint 23 such that the latter can be more easily installed and is better protected in relation to contamination. However, this in most instances results in a distance for absorbing the forces which is smaller in comparison to the distance which in the variant according to FIGS. 1*a* and 1*b* absorbs the forces between the frame parts 14, 15, the distance in the vehicle 1 in FIGS. 2*a* and 2*b* corresponding to the length of the single joint 23 along the pivot axis X.

It is also advantageous in the variants according to FIGS. 1*a* to 2*b*, and 6*a* to 6*b*, that a bicycle saddle and the drive device 31 are disposed on the front or first frame part 14 and, as a result, lean into curves when the first frame part 14, having a driver sitting on the vehicle 1, or on the bicycle saddle, respectively, is pivoted or inclined, respectively, such that a driving experience as in a conventional bike is established.

Illustrated in the respective plan views from above of the variants in FIGS. 1*b* and 2*b* and 6*b*, apart from the central position, resting position or neutral position of the first frame part 14, these being illustrated using a solid line, are also by way of example deflected or pivoted positions of the first frame part 14 in relation to the second frame part 15, this being illustrated using dashed lines. It becomes obvious here that the contact point A is not or at least not significantly displaced, and the front or first frame part 14 can be tilted or rotated or pivoted, respectively, in the transverse direction Q of the vehicle without the front or first frame part 14 changing the track of the single wheel 11 thereof in relation to the rear or second frame part 15.

In the case of a variation of the vehicle geometry, for example as a result of a pressure loss in the single wheel 11 or a wheel change of the single wheel 11, it can arise that the contact point A of the single wheel 11 is displaced such that the pivot axis X defined by the joints 21, 22, 23 would no longer run through the contact point A, or exactly through the latter, respectively. It is therefore provided that the joints 21, 22, 23 are adjustable, this however not being illustrated in the figures. In the variant according to FIG. 1, a position of the first joint 21 and/or of the second joint 22 is variable in the longitudinal direction L and/or height direction H of the vehicle to this end, such that the profile of the pivot axis X can be adjusted to a new contact point A by way of corresponding variation or displacement of the position. The same also applies to a single joint 23 according to the embodiment of FIGS. 2*a* and 2*b*, wherein, as an alternative to an adjustability of the position, an adjustability of the angle may also be provided here such that the angle of the joint 23 in relation to the first frame part 14 and/or the second frame part 15 in the variant according to FIGS. 2*a* and 2*b* is varied, and the profile of the pivot axis X can be adjusted as a result.

Figure 3A:
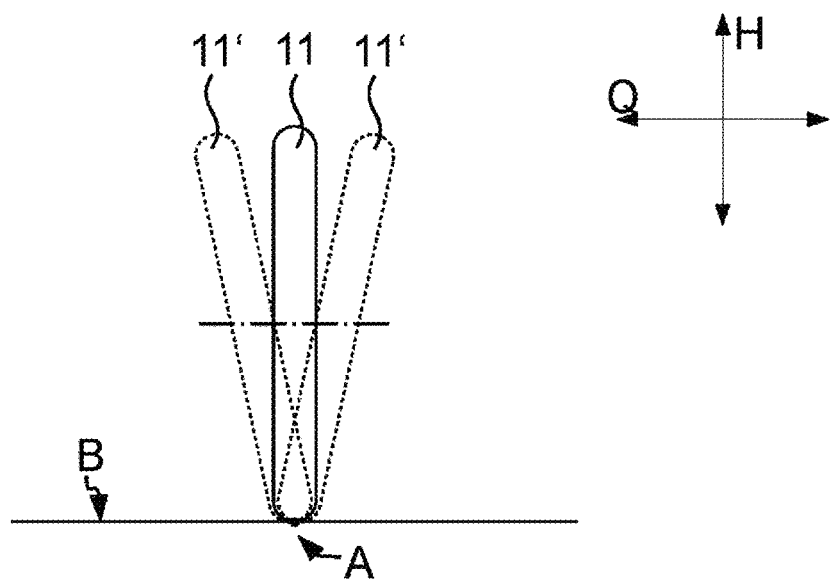
FIG. 3a shows a view of a single wheel in the central position and deflected positions of a vehicle variant according to the invention.
Figure 3B:
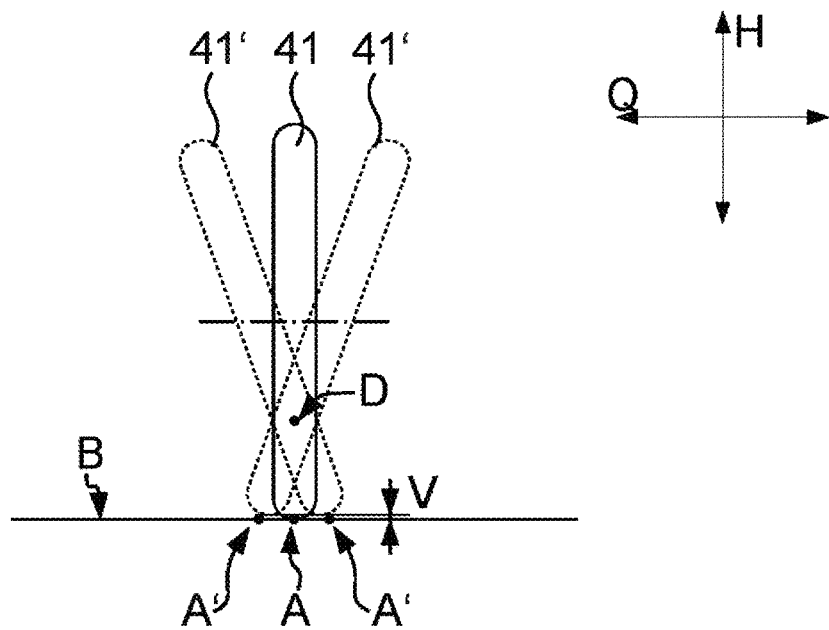
FIG. 3b shows a view of a single wheel in the central position and deflected positions of a vehicle of the prior art.

In order to highlight the difference resulting from the depicted embodiment in comparison to the prior art, the single wheel 11 of a vehicle 1 is illustrated in FIG. 3*a*, and a single wheel 41 of a vehicle known from the prior art is illustrated in FIG. 3*b*. By tilting the first frame part 14 in relation to the second frame part 15, as is provided in the variants according to FIGS. 1*a* to 2*b*, for example, the single wheel 11 or the front wheel, respectively, is inclined about the contact point A such that the latter acts as the fulcrum for the single wheel 11. Accordingly, the single wheel 11, when transitioning to the tilted positions 11' thereof, is rotated about a fulcrum that lies in the plane of the ground B, this corresponding to the behavior of a normal wheel.

Deviating therefrom, FIG. 3*b* shows the behavior of a vehicle of the prior art, which likewise has a divided frame, wherein the pivot axis of the front frame part of the latter in relation to the rear frame part of the latter does not run through the contact point A of the single wheel 41 on the ground, but runs parallel to the ground, for example, such that a fulcrum D for the single wheel 41 results when the frame parts are pivoted. When the frame parts are tilted, the single wheel 41 rotates to the tilted positions 41' thereof, wherein the contact point A as a result is displaced in the transverse direction Q such that this results in deviating contact points A', or a displacement of the track of the single wheel 41, respectively. The single wheel 41 remains in contact with the ground B by virtue of gravity. If the single wheel were to be fixed about the rotation axis thereof, or about the fulcrum D thereof, respectively, this, when rotating, would result in a height offset H in relation to the ground B.

FIGS. 4*a* and 4*b*, and 5*a* to 5*d*, by way of example show different drive concepts which can be used in the vehicle discussed above, and variations thereof. The fundamental construction of the vehicle 1, which is illustrated only in portions in FIGS. 4*a* and 4*b*, and 5*a* to 5*d*, here corresponds to the construction of a vehicle 1 according to the variants of FIGS. 1*a* to 2*b*, and 6*a* to 6*b*.

The embodiments according to FIGS. 4*a* and 4*b* provide a chain drive, or a chain gear 34, respectively, as the torque transmission device, wherein the chain of the chain gear 34 is configured to be twisted or torsioned, respectively, within a pre-defined angular range about the pivot axis X, without being damaged.

Instead of a centrally disposed differential 35, the refinement according to FIG. 4*a* provides a constant velocity gear 38 which by way of the torque transmission device 34, configured as the chain gear 34, transmits a torque generated by a muscle-power-operated drive device 31 and a mid-mounted motor 33 to the wheels. By way of example, the constant velocity gear 38 is disposed so as to be centric on the rear axle, whereas the chain gear 34 is disposed so as to be lateral to a symmetry plane S of the vehicle. Each of the wheels 12, 13 of the pair of wheels provides a freewheeling hub 36, the latter conjointly acting like a differential 35.

Instead of a mid-mounted motor 33, the drive concept according to FIG. 4*b* provides for each of the wheels 12, 13 of the pair of wheels a wheel hub motor 32 assigned thereto, as well as a compensation device 38 configured as a chain-driven differential 37. By way of example, the differential 37 as well as the chain gear 34 are disposed so as to be lateral to a symmetry plane S of the vehicle.

FIGS. 5*a* to 5*d* propose four further drive concepts for the vehicles according to FIGS. 1*a* to 2*b*, and variations thereof. These drive concepts have at least one drive device 31, 33 which generates a torque and which is disposed on the first frame part 14 and, by way of a torque transmission device 34, is configured to transmit the torque to at least one of the wheels 12, 13 of the pair of wheels. The torque transmission device 34 comprises a compensation device 38 for compensating torsion of the torque transmission device 34 caused by the rotation of the first frame part 14 in relation to the second frame part 15 about the pivot axis X. In order to achieve an optimum operating mode, the torque transmission device 34, at least in the pivoted region, and the compensation device 38 in all variants are disposed on a symmetry plane S of the vehicle 1 that is aligned in the longitudinal direction L. Alternatively however, the torque transmission device 34 and/or the compensation device 38 can be disposed so as to be lateral to the symmetry plane S.

Figure 5A:
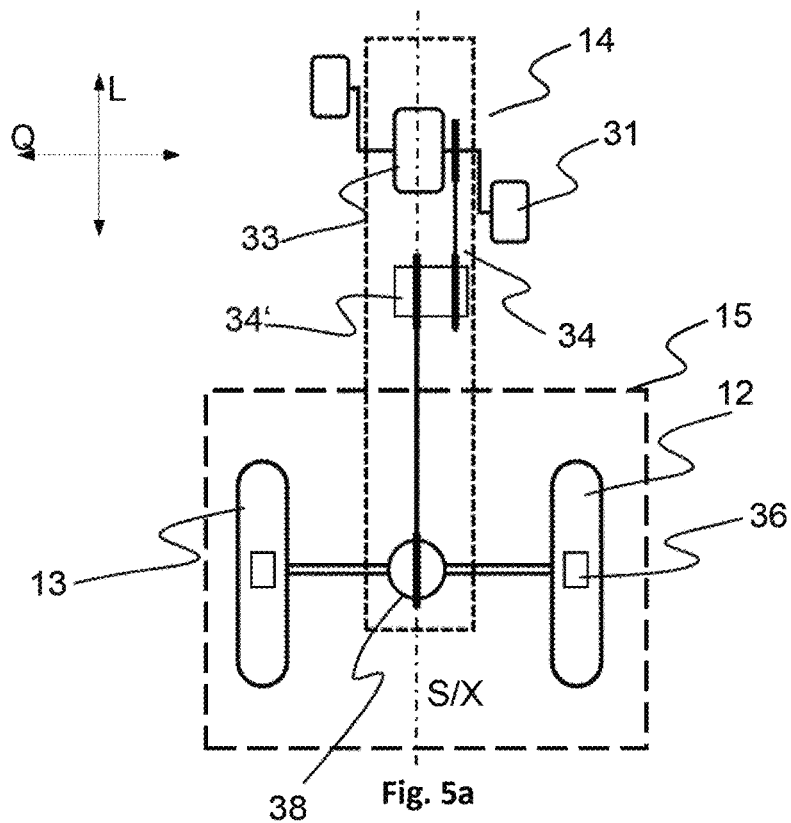
FIGS. 5a-d show in each case drive configurations of further vehicle variants.

According to FIG. 5*a*, the first frame part 14 is assigned a muscle-power-operated first drive device 31 which is presently embodied as a bottom bracket bearing, or as a pedal mechanism, respectively. The latter can optionally comprise a motor 33 which by way of motorized force can support the muscle-power operation in a motorized manner. By way of example, this motor 33 is configured as a mid-mounted motor and disposed so as to be coaxial with the pedal drive. The pedal drive, by way of a dual-stage chain gear of the first torque transmission device 34, is connected to the compensation device 38.

The chain gear in the embodiment illustrated comprises two stages, each having a dedicated chain. Accordingly, a first chain is provided for transmitting a torque from the first drive device 31 to a driveshaft 34'. From the latter, a torque is transmitted to the rear sprocket by way of a second chain, the rear sprocket being assigned to the compensation device 38, or being connected in a torque-transmitting manner to the latter. The driveshaft 34' can be configured only as a shaft and enable a lateral offset in terms of the guiding of the chain. As described above, this makes it possible for at least the rear chain, which is disposed in the pivoted region, to be guided along the symmetry plane S of the vehicle in the longitudinal direction of the vehicle.

The driveshaft 34' can optionally however also comprise a gearbox and be configured for gearing the transmitted torque. The gearbox is preferably configured so as to be shiftable such that at least two gears or more than two gears are selectable.

In any case, the driveshaft 34' is likewise assigned to the first frame part 14. This means that the driveshaft 34', when the first frame part 14 is pivoted in relation to the second frame part 15, is likewise conjointly pivoted.

In the embodiment illustrated in FIG. 5*a*, the compensation device 38 comprises a constant velocity joint. The latter is provided for avoiding torsioning of the chain in that the rear sprocket, or the part of the constant velocity joint connected thereto, respectively, is pivoted conjointly with the chain. In this way, the compensation of the pivoting movement of the torque transmission device 34, caused by the pivoting of the first frame part 14 in relation to the second frame part 15 about the pivot axis X, takes place in the constant velocity joint.

According to the illustration, the constant velocity joint is disposed so as to be centric on the rear axle of the vehicle 1 (thus likewise on the symmetry plane S of the vehicle 1). The rear axle, as a rigid axle, can be continuously configured, or be formed by two rigid shafts which are connected in a torque-transmitting manner to the two wheels 12, 13 of the pair of wheels.

Each of the two wheels 12, 13 may only optionally have a freewheeling hub 36 for connecting to the respective shaft. Alternatively or additionally to the respective freewheeling hub 36, one wheel hub motor (not illustrated) may in each case be provided for each of the two wheels 12, 13.

Figure 5B:
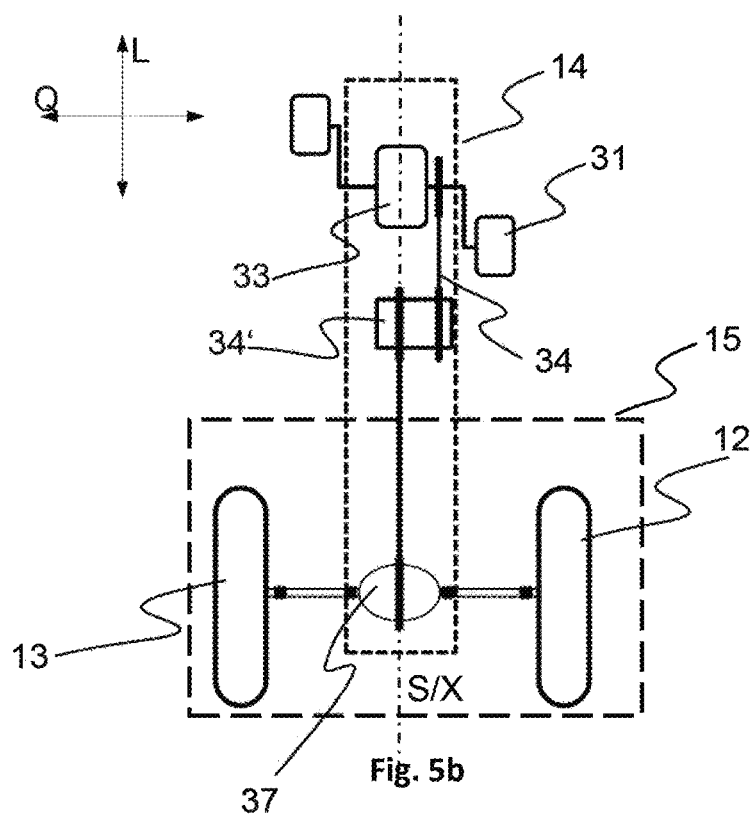

The embodiment illustrated in FIG. 5b is substantially identical to the embodiment illustrated in FIG. 5a so that reference is made to the description pertaining to the former in order for the latter to be explained. One difference lies in the design embodiment of the compensation device 38, the latter instead of a constant velocity joint comprising a differential 37. The latter is assigned to the first frame part 14 and is accordingly pivoted conjointly therewith. In this way, torsioning of the torque transmission device 34, caused by the pivoting of the first frame part 14 in relation to the second frame part 15 about the pivot axis X, is avoided. Pivoting takes place only downstream, by the differential 37 being pivoted relative to the second frame part 15. In order for this to be compensated, the compensation device in the embodiment illustrated comprises two articulated shafts 37' which in an articulated and torque-transmitting manner connect two output sides of the differential 37 to the two wheels 12, 13 of the pair of wheels.

One wheel hub motor (not illustrated) for each of the two wheels 12, 13 may be provided only optionally.

Figure 5C:
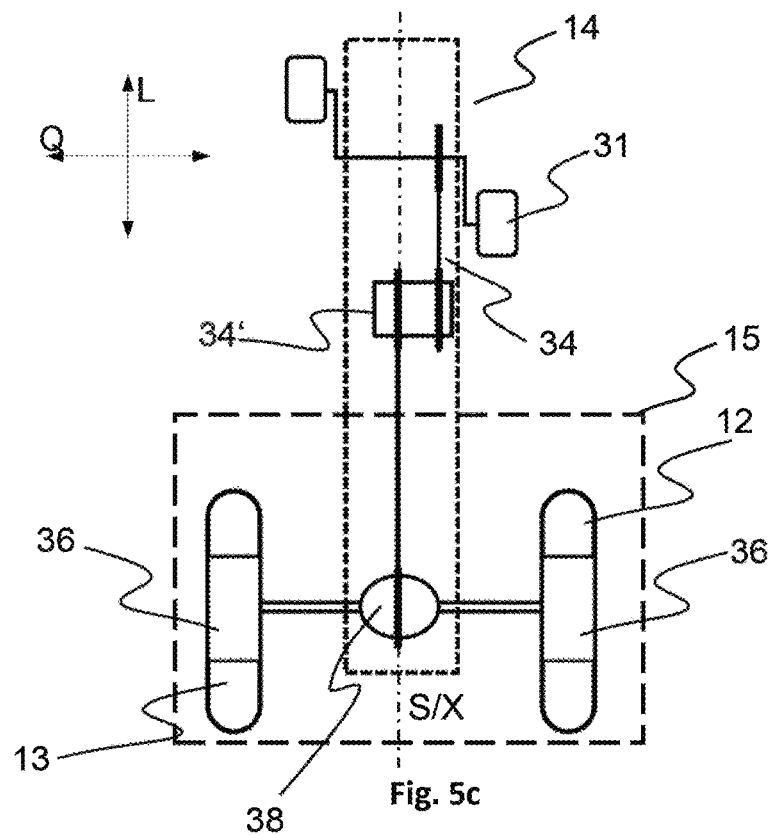

The embodiment illustrated in FIG. 5c is substantially identical to the embodiments illustrated in FIG. 5a or 5b, so that reference is made to the description pertaining to the former in order for the latter to be explained. One difference lies in the design embodiment of the motorized support of the drive. Instead of the one motor 33, one wheel hub motor 32 is provided in each case in the two wheels 12, 13, a mechanical torque being transmitted to the wheel hub motors 32 by way of the shafts. The compensation device 38 can either be a constant velocity joint, analogous to FIG. 5a, or a differential 37 having articulated shafts 37', analogous to FIG. 5b.

Figure 5D:
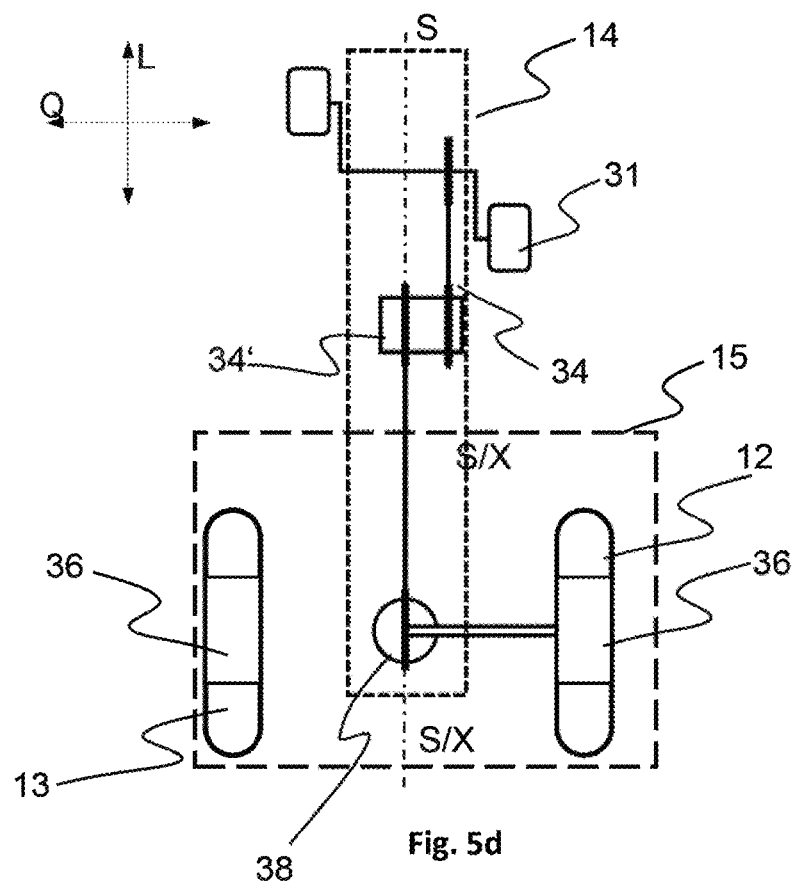

FIG. 5d shows an embodiment which is based substantially on the embodiment described in FIG. 5c while simultaneously using the constant velocity joint. One difference lies in that the constant velocity joint on the output side is connected in a torque-transmitting manner to only one of the two wheels 12, 13 of the pair of wheels. Instead of a rigid axle, or two rigid shafts, only one rigid shaft to the right wheel 12 is illustrated. A mirror-image disposal, in which only the left wheel 13 is driven by a rigid shaft, would of course be likewise possible. The respective other wheel of the pair of wheels is driven exclusively by way of a dedicated wheel hub motor 32.

According to FIG. 5d, a transmission of torque to the right wheel 12 of the two wheels 12, 13 of the pair of wheels in the image plane takes place by way of the second chain of the chain gear 34, the rear chain in the longitudinal direction L of the vehicle, a wheel hub motor 32 being provided as a "master" in the right wheel 12. The two wheels 12, 13 of the pair of wheels are not fastened by way of a common axle or shaft, but are in each case fastened separately or individually, respectively, on the second frame part 15. The left wheel 13 in the image plane likewise possesses a wheel hub motor 32, which is however configured as a "slave". Depending on a torque that is transmitted from the chain drives 34, 34' to the wheel hub motor 32, configured as the "master", of the right wheel 12, and/or depending on a control that is adjustable by way of an "accelerator" lever, for example, the wheel hub motor 32, configured as the "slave", of the left wheel 13 can be actuated, and the left wheel 13 be driven.

In all embodiments according to FIGS. 5a to 5d, torsioning of the chain that causes wear and tear can be effectively avoided thanks to the respective compensation device 38.

As has already been described above, the two joints 21, 22 in the variant according to FIGS. 6a and 6b are likewise disposed below the load carrier 15'. The first joint 21 in the longitudinal direction L is disposed in front, and the second joint 22 in the longitudinal direction L of the vehicle 1 is disposed behind the common axle that supports the two wheels 12, 13. The first frame part 14 here, by way of an arm-shaped portion 14', extends to the second joint 22 in order for the latter to be supported. The arm-shaped portion 14' thus likewise extends to behind the common axle. The arm-shaped portion here has an arcuate portion which is provided as a clearance for the common axle. The variant of FIGS. 6a and 6b otherwise is based on the variant according to FIGS. 1a, 1b, so that reference is made to the description pertaining to the latter in order for the further components to be described.

The invention is not limited in its embodiment to the preferred exemplary embodiments set out above. Rather, a number of variants are conceivable, which make use of the illustrated solution even with embodiments of fundamentally different types.

The invention claimed is:

1. A vehicle, comprising:
   a multi-part frame;
   a single wheel; and
   a pair of wheels having two mutually spaced-apart wheels, wherein
   the single wheel is connected to a first frame part of the frame, wherein
   the two wheels of the pair of wheels are mounted on a second frame part of the frame so as to be rotatable about a common axis, wherein
   the first frame part and the second frame part are connected by at least two joints and are mutually rotatable about a pivot axis defined by the at least two joints, wherein the at least two joints are disposed so as to be mutually spaced apart on the pivot axis, and wherein a position of a first joint of the at least two joints and/or of a second joint of the at least two joints in relation to the first frame part and/or the second frame part is adjustable, wherein
   the pivot axis runs through one contact point of the single wheel; and
   at least one first drive device generating a torque, wherein the at least one first drive device being disposed on the first frame part and is configured to transmit the torque to at least one of the wheels of the pair of wheels via a torque transmission device, and wherein
   the torque transmission device comprises a compensation device for compensating torsion of the torque transmission device that is caused by the rotation of the first frame part in relation to the second frame part about the pivot axis.

2. The vehicle according to claim 1, wherein the torque transmission device comprises at least one of a chain gear having a chain and a belt drive having a timing belt.

3. The vehicle according to claim 1, wherein the compensation device comprises a constant velocity joint.

4. The vehicle according to claim 3, wherein the constant velocity joint is assigned to at least one of the first frame part and the second frame part.

5. The vehicle according to claim 1, wherein the compensation device comprises a differential which by way of at least one articulated shaft transmits the torque to the at least one wheel of the pair of wheels.

6. The vehicle according to claim 1, wherein at least one of the two wheels of the pair of wheels has a wheel hub motor.

7. The vehicle according to claim 1, wherein
the single wheel is a front wheel, and wherein
the front wheel is on a wheel fork that is connected to the first frame part so as to be pivotable about a steering axis.

8. The vehicle according to claim 1, wherein
the first joint of the two joints being at least one of a ball joint, a radial bearing, and an elastomer element; and wherein
the second joint of the two joints being at least one of a ball joint, a radial bearing, and an elastomer element.

9. The vehicle according to claim 1, wherein a position of the first joint and/or of the second joint is adjustable in a horizontal direction and a vertical direction in the context of the normal orientation of the vehicle, respectively, and/or in a vertical direction and a longitudinal direction in terms of the normal orientation of the vehicle.

10. The vehicle according to claim 1, further comprising a delimiting device which is configured to restrict a rotatability of the first frame part in relation to the second frame part about the pivot axis.

11. The vehicle according to claim 1, further comprising a restoring device which is configured to rotate the first frame part between a position deflected in relation to a pre-defined central position and the pre-defined central position.

12. A vehicle, comprising:
a multi-part frame;
a front wheel; and
a pair of rear wheels having two mutually spaced-apart rear wheels, wherein
the front wheel is connected to a first frame part of the frame, wherein
the rear wheels are mounted on a second frame part of the frame so as to be rotatable about a common axis, wherein
the first frame part and the second frame part are connected by exactly one joint and are mutually rotatable about a pivot axis defined by the one joint, wherein
the pivot axis runs through one contact point of the front wheel, and wherein
an angle of the one joint in relation to the first frame part and/or the second frame part is adjustable so as to be able to adjust a profile of the pivot axis through the contact point; and
at least one first drive device generating a torque, wherein
the at least one first drive device being disposed on the first frame part and is configured to transmit the torque to at least one of the rear wheels via a torque transmission device, and wherein
the torque transmission device comprises a compensation device for compensating torsion of the torque transmission device that is caused by the rotation of the first frame part in relation to the second frame part about the pivot axis.

13. The vehicle according to claim 12, wherein the torque transmission device comprises at least one of a chain gear having a chain and a belt drive having a timing belt.

14. The vehicle according to claim 12, wherein the compensation device comprises a constant velocity joint.

15. The vehicle according to claim 14, wherein the constant velocity joint is assigned to at least one of the first frame part and the second frame part.

16. The vehicle according to claim 12, wherein the compensation device comprises a differential which by way of at least one articulated shaft transmits the torque to the at least one of the rear wheels.

17. The vehicle according to claim 12, wherein at least one of the rear wheels has a wheel hub motor.

18. The vehicle according to claim 12, wherein the exactly one joint is formed by at least one radial bearing.

* * * * *